Nov. 4, 1969 R. O. CARLSON 3,476,210

VENTILATED SOUND-REDUCING ENCLOSURE FOR A TELEPRINTER

Filed May 22, 1968 2 Sheets-Sheet 1

Inventor:
ROBERT O. CARLSON

Joseph J. Grass
Attorney

Inventor:
ROBERT O. CARLSON
Joseph J. Grass
Attorney

United States Patent Office 3,476,210

Patented Nov. 4, 1969

3,476,210

VENTILATED SOUND-REDUCING ENCLOSURE FOR A TELEPRINTER

Robert O. Carlson, Arlington Heights, Ill., assignor to SCM Corporation, New York, N.Y., a corporation of New York Filed May 22, 1968, Ser. No. 731,102
Int. Cl. E04b *1/99*
U.S. Cl. 181—33 21 Claims

ABSTRACT OF THE DISCLOSURE

There is disclosed an enclosure for a teleprinter or the like, and a muffler through which the record medium passes; a window in the enclosure and a transparent portion of the muffler enable printing on the record medium within the enclosure and the muffler to be read. The record medium enters the muffler at an exit opening in the enclosure. The window terminates at a severing edge at the exit opening. The exit opening is relatively close to the printing zone so that the distance between the printing zone and the tear-off point is relatively short. The enclosure is divided into two chambers, one housing the teleprinter and the other which communicates with it providing noise reduction. Ventilation air is forced through the chambers to cool the teleprinter.

BACKGROUND OF THE INVENTION

Field of the invention

This invention relates to a ventiltaed sound-reducing enclosure for a teleprinter.

Description of the prior art

There have been prior art attempts to provide sound-reducing enclosures for impact printers. Some of these attempts have provided enclosures for housing printers in which the record medium was confined within the enclosure, thereby making it either not conveniently accessible for tear-off or not readable near the printing zone, or in which noise was not effectively reduced because the noise transmitted by the paper was not deadened.

Summary of the invention

The purpose of the invention is to provide a novel, ventilated, sound-reducing enclosure and muffler for a printer of the impact-printing type, in which noise resulting from impact printing is effectively reduced, the printing on the record medium is visible from the printing zone to the end of the record medium, and the record medium can be torn off a short distance from the printing zone. The novel arrangement of chambers and openings, together with fan or blower means, provides for cooling of the printer without permitting the escape of noise.

Figures 6, 7, 8, 9, 10, 11, 12:
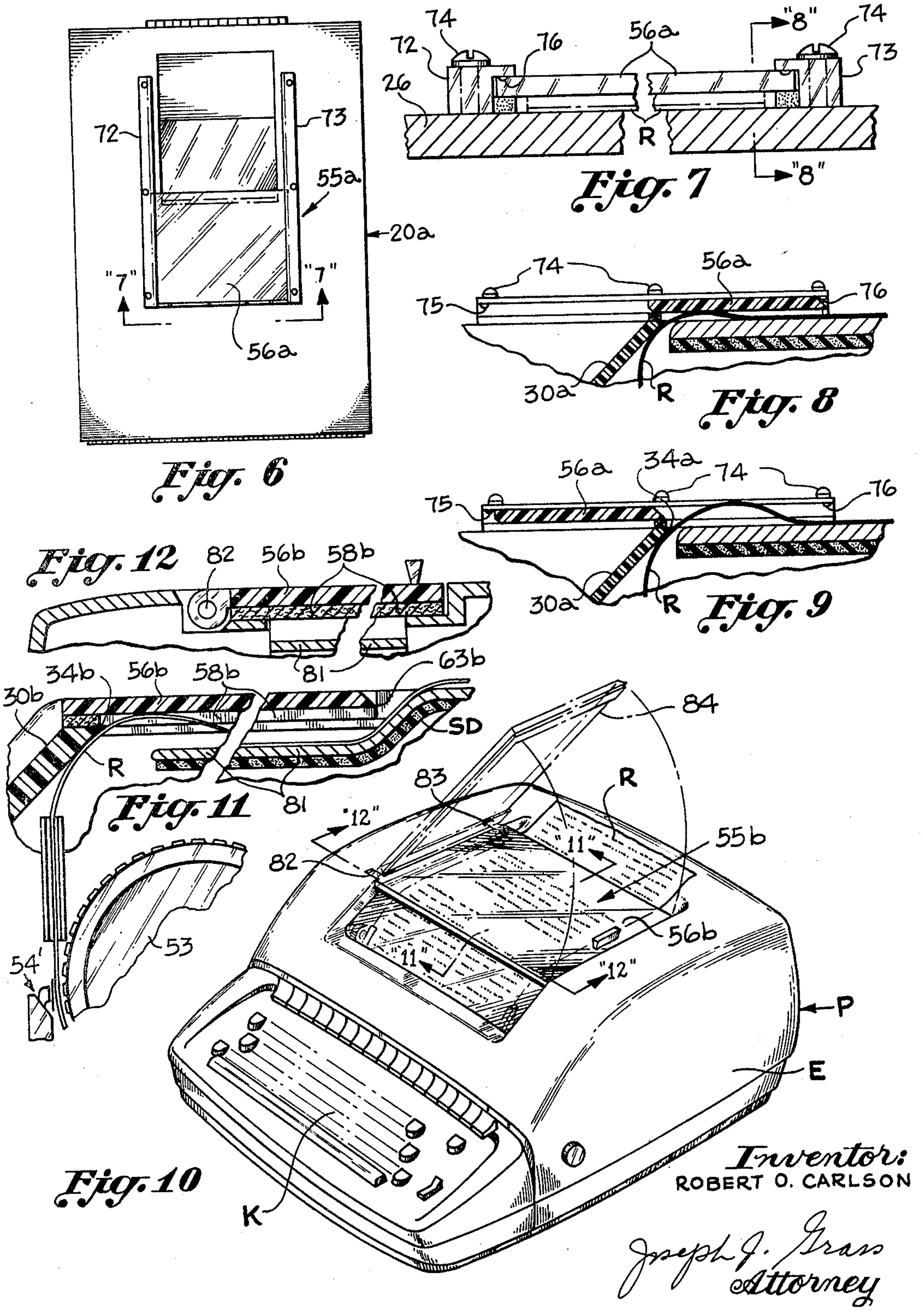
FIGURE 6 is a top plan view of an enclosure embodying an alternative form of the invention.
FIGURE 7 is a view, partly in section, taken along line 7—7 of FIGURE 6.
FIGURE 8 is a sectional view taken along line 8—8 of FIGURE 7, showing a transparent plastic muffler plate its operative position.

FIGURE 9 is a sectional view similar to FIGURE 8, but showing the muffler plate in its inoperative position;

FIGURE 10 is a perspective view of a teleprinter embodying an alternative form of the invention;

FIGURE 11 is a sectional view taken along line 11—11 of FIGURE 10; and

FIGURE 12 is a sectional view taken along line 12—12 of FIGURE 10.

DESCRIPTION OF THE PREFERRED EMBODIMENTS

Referring now to the embodiment of FIGURES 1 through 5, there is shown a ventilated sound-reducing enclosure generally indicated at 20 having vertically extending side panels 21 and 22 secured to a horizontally extending floor panel 23, and front and rear panels 24 and 25, respectively, secured to the side panels 21 and 22. The front panel 24 terminates a substantial distance above the floor panel 23 to provide a front access opening to enable record medium R to be stacked on the floor panel 23. The rear panel 25 is secured to the floor panel 23. A top panel 26 is pivotally mounted with respect to the upper end of the rear panel 25 by a piano-type hinge 27, thereby providing access to the printer P. The top panel 26 includes a planar portion 28having a rectangular cutout 29. A window 30 joins the upper surface of the planar portion 28 at an acute angle. Panel section 31 connects the planar portion 28 and the lower end of the window 30. Triangular panel sections 32 and 33 are secured to the ends of the window 30 and the section 31 as well as to the lower surface of the planar portion 28. The window 30 is composed of transparent material, for example transparent plastic material known commercially under the trademark "Plexiglas." The window 30 is shown to terminate at an exit opening 34' with a sharp severing or tear edge 34 by means of which the record medium R can be severed as by tearing.

Figures 1, 2, 3, 4:
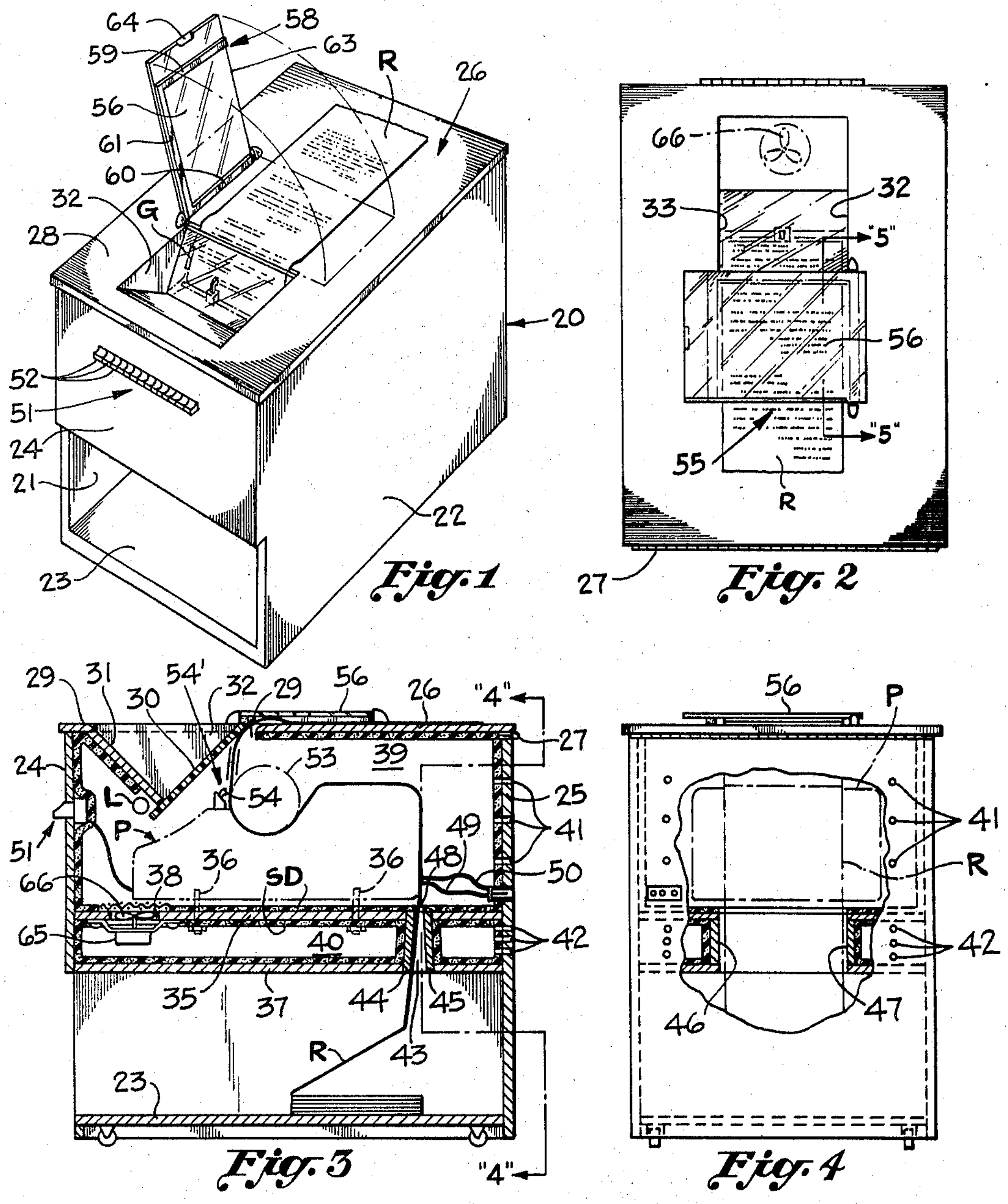
FIGURE 1 is a perspective view of a ventilated sound-reducing enclosure embodying the invention.
FIGURE 2 is a top plan view of the enclosure shown in FIGURE 1.
FIGURE 3 is a sectional view of the enclosure shown in FIGURES 1 and 2.
FIGURE 4 is a sectional view taken generally along lines 4—4 of FIGURE 3.
Figure 5:
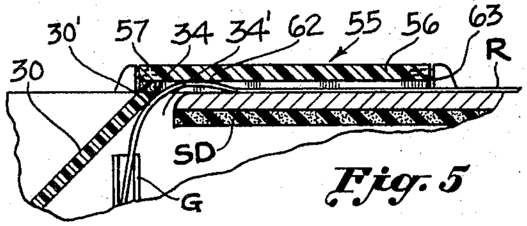
FIGURE 5 is a sectional view taken along line 5—5 of FIGURE 2.

As best seen in FIGURES 3 and 5, the record medium R is directed upwardly from the printing zone 54' into contact with the window 30 at 30'. The window 30 guides the record medium R into and through the record medium exit opening 34' and into the muffler 55. The distance from the printing zone 54' to the tearoff point at the severing edge 34 is relatively short. Thus, assuming the last line of the message has been printed and it is desired to sever the record medium R immediately below the end of the message, the record medium R is line fed a short distance until the end of the message clears the severing edge 34. By pivoting the muffler member 58 into the position shown in FIGURE 1, the operator can tear off the end portion of the record medium containing the printed message by pulling it against the severing edge 34.

The enclosure 20 also includes a horizontal shelf 35 secured at its ends or side edges to the panels 21, 22, 24 and 25. The shelf 35 is shown to mount the printer P, typically a teleprinter, which is capable of impact printing on the record medium R. When the printer P is mounted on the shelf 35, and held in place by machine screws 36, the usual dust cover or other enclosure is not provided in that it would interfere with the free circulation of ventilation air to the components of the printer P. A horizontal panel 37 disposed below the shelf 35 is also secured to the panels 21, 22, 24 and 25. The shelf 35 has a circular opening 38 which provides for communication of ventilation air between chambers 39 and 40. The chamber 39 is formed by portions of panels 21, 22, 24 and 25, the top panel 26, and the shelf 35. The chamber 40 is formed by portions of the panels 21, 22, 24 and 25, the shelf 35 and the panel 37. The chambers 39 and 40 are lined with suitable sound deadening material SD. Air ingress openings 41 are provided in the rear panel 25 and provide communication between the ambient air outside the enclosure 20 and the chamber 39. Air egress openings 42 provide communication between the chamber 40 and the ambient air outside the enclosure 20. Electric motor 65 rotates a propeller-type fan blade 66 in a direction to draw air from the chamber 39 into the chamber 40, as is preferable. The record medium R can be drawn through a passageway 43 by the record medium feed mechanism (not shown) of the printer P. The passageway 43, which is shown to taper, is defined by sections 44, 45, 46 and 47. The passageway 43 opens into the chamber 39 at a slit-like opening 48 at the rear of the printer P. Any small amount of air entering the chamber 39 through the pasageway 43 will pass into contact with the printer P. Even though the sections 44, 45, 46 and 47 extend through the chamber 40, the ventilation air can reach the egress openings 42 through the space between the side panel 22 and section 46 and through the space between the side panel 21 and the section 47.

Suitable connectors 49 and 50 connect the printer P to a siutable source of electrical energy for driving the printer motor, and to a line (not shown) by which a telegraphic signal is received, respectively. A mode panel 51 having a plurality of switches 52 enables the operation of the printer P to be controlled. One of the switches 52 can be a line-feed switch whereby the record medium R can be line fed to advance the record medium, as is known in the art.

The printer P is shown to include a print drum 53 and print hammer means 54 mounted in printing cooperation with the print drum 53. The window 30 enables the printing on the record medium R to be viewed between the printing zone 54′ and the severing edge 34. An edge guide G can be provided for the record medium R, and a lamp L can be provided to illuminate the record medium R.

A muffler generally indicated at 55 is shown to include a transparent member or window 56 in the form of a flat transparent plastic plate. The transparent member 56 is pivotally mounted by pivot pins 57 to the upper surface of the planar portion 28. The member 56 is movable from the operative noise-muffling position shown in FIGURES 2, 3, 4 and 5 to the inoperative position shown in FIGURE 1. The transparent muffler member 56, the upper surface of the planar portion 28 which it overlies, and a seal 58 of generally U-shaped extent provide a passageway through which the record medium R passes when the member 56 is in its operative position. The seal 58, which is composed of resilient material such as felt, sponge rubber or the like, is shown to be secured to the underside of the member 56 and includes a pair of parallel spaced-apart seal portions 59 and 60 joined by a seal portion 61 which is perpendicular to the seal portions 59 and 60. The seal portions 59 and 60 provide a seal between the upper surface of the top panel 26 and the transparent member 56 when the transparent member 56 is in its operative position. The seal portion 61 is shown to provide a seal between the upper end of the window 30 and the underside of the transparent member 56. The member 56 is transparent throughout its length and width and the seal portions 59 and 60 are spaced apart by a distance which is greater than the width of the record medium R. As best shown in FIGURE 5, the record medium R contacts the window 30 and is guided into contact with the lower surface of the member 56 which deflects the record medium R at 62 causing it to undulate so that it will pass along the upper surface of the top panel 26.

The end of the member 56 is also provided with a several lines have been printed, the part of the record medium R to be torn off at the edge 63 without pivoting the member 56 to the position shown in FIGURE 1.

In use, assuming that a supply of the record medium R is stacked on the floor panel 23 and some of it has been threaded into the printer P and that the top panel 26 is in the closed position shown in the drawings, the printing on the record medium can be read as soon as the print hammer means 54 has printed on the record medium R. After one line has been printed on the record medium R the record medium R is line fed so that the next line can be printed. The printing on the record medium R in the enclosure 20 is visible through the window 30. When several lines have been printed, the part of the record medium R containing the first printed line reaches the exit opening. As additional lines are printed on the record medium R, the leading edge of the record medium R moves into the muffler 55. All the printing on the record medium R is visible on that portion of the record medium which lies beyond the end of member 56 as well as through the window 30 and through the transparent member 56. As the record medium contacts the point 30′ of the window 30 and point 62 of the muffler 55, and then lies down on the upper surface of the top panel 26, passage of substantially all air is blocked from entering the chamber 39 via the muffler 55. If it is desired to tear off the end portion of the record medium R close to the printing zone, the operator reaches into the undercut portion 64 of the transparent member 56 and pivots the member 56 to the position shown in FIGURE 1. The end portion of the record medium R can then be grasped and pulled against the edge 34 to sever the end portion of the record medium.

While the printer P was operating, the fan motor 65 was on, thereby rotating the propeller-type fan blade 66 in the throat of the opening 38 and drawing ventilation air through the ingress openings 41, over and through the printer P, and through the opening 38. Air discharged into the chamber 40 via the opening 38 is exhausted through the egress openings 42. A wire mesh screen 38′ covers the opening 38 to prevent any solid materials from contacting the fan blade 66.

Referring now to the embodiment of FIGURES 6, 7, 8 and 9, there is shown an enclosure 20a which is identical to the enclosure 20 except for the construction of the muffler and its mounting means. A muffler, generally indicated at 55a, is shown to include a slidably mounted transparent plastic muffler member or window 56a, which is movable from the position shown in FIGURE 8 to the position shown in FIGURE 9. The transparent member 56a is guided for forward and rearward movement by angle-shaped guides 72 and 73 which are secured to the top panel 26a by threaded fasteners 74. The guides 72 and 73 have front and rear stops 75 and 76, respectively, to limit the sliding movement of the transparent member 56a. If the member 56a is slid into the position shown in FIGURE 9, the record medium R can be severed by a sharp edge 34a at the terminal end of the window 30a. Moreover, the member 71 can be positioned at any position between the stops 75 and 76 so that the record medium R can be severed at the position shown in FIGURE 8, at the position shown in FIGURE 9, or at any other position therebetween.

Referring to the embodiment of FIGURES 10, 11 and 12, there is shown a teleprinter P having a keyboard K and an enclosure E. The enclosure E provides an enclosure for the operative components of the teleprinter P, and although it may be lined with sound-deadening material SD its basic purpose is to provide an attractive dust cover. By confining the record medium R within the muffler, generally indicated at 55b, some sound-deadening is accomplished. The muffler 55b is formed by a plate 81, a transparent muffler member 56b, and a seal 58b of U-shaped extent. The plate 81 forms part of the enclosure E. The transparent member 56b is pivotally mounted at 82 and 83. The end portion of the record medium R can be severed at a severing edge 34b when the member 56b is pivoted to the position shown by phantom lines 84. The record medium R can also be severed at a severing edge 63b at the end of the member 56b. It is apparent that the printing on the record medium R can be read not only through window 30b but also through the transparent muffler member 56b. Therefore, not only is the printing on the record medium R completely readable, but some sound-reduction is accomplished by means of the muffler 55b.

With respect to the embodiment of FIGURES 1 through 5, by way of example, not limitation, the gap between the upper surface of the planar portion 26 and the lower surface of the member 56, as determined by the thickness of the seal 58, is about one-eighth of an inch; the distance between the seal portions 59 and 60 is about ten inches; and the distance between the seal portion 61 and the edge 63 of the member 56 is about seven inches. The exit opening 34' is about nine and one-half inches long and about three-sixteenths of an inch wide. The dimensions of the muffler components of the mufflers of the embodiments of FIGURES 6 through 9 and 10 through 55b and 55c are substantially the same as the muffler 55 of the embodiment of FIGURES 1 through 5. The length of the muffler can be varied; even when the muffler is short, for example about two inches, and substantial reduction in sound level is accomplished. The longer the muffler, the more sound level due to impact printing is reduced.

The windows 30a and 30b and the transparent members 56, 56a and 56b are all preferably composed of the same transparent material as the window 30, in that plastic material has better sound deadening properties than glass.

Other embodiments and modifications of this invention will suggest themselves to those skilled in the art, and all such of these as come within the spirit of this invention are included within its scope.

I claim:

1. For a printer capable of impact printing on a continuous record medium: an enclosure for a printer, said enclosure having a window and a record medium exit opening, and muffler means communicating with said exit opening and providing a passageway for the record medium which extends away from said exit opening, said muffler means including a window which serves as an extension of said enclosure window, said enclosure and muffler windows enabling the printing on the record medium in the enclosure and in said muffler means to be read.

2. The invention as defined in claim 1, including severing means at said exit opening, and means mounting said muffler window for movement to an inoperative position to enable the record medium to be severed by said severing means.

3. For a printer capable of impact printing on a continuous record medium: an enclosure for housing the printer, said enclosure having an exit opening for the record medium, and a muffler communicating with said exit opening and providing a narrow passageway for the record medium, said muffler having a transparent portion extending the length of said muffler and at least coextensive with the printing across the record medium so that all the printing on the record medium in the muffer is readable.

4. The invention as defined in claim 3, including severing means at said exit opening, said transparent portion of said muffler being movable to an inoperative position to enable the end portion of the record medium to be severed by said severing means.

5. For a printer capable of impact printing on a continuous record medium: an enclosure providing a chamber for housing the printer, a window at the front of said enclosure so that the printing on the record medium can be read while the record medium is still in said enclosure, a muffler mounted by said enclosure through which the record medium exits, said muffler having a rearwardly opening exit opening, rearwardly opening ingress and egress openings in said enclosure through which ventilation air passes, and means providing forced circulation of air through said chamber via said ingress and egress openings.

6. The invention as defined in claim 5, wherein said ingress and egress openings and said record medium exit opening are small, and means guiding the record medium into said exit opening at an angle to cause the record medium to span the distance between opposite sides of said muffler to block passage of air through said exit opening.

7. For a printer capable of impact printing on a continuous record medium: an enclosure for a printer, said enclosure having a window and a record medium exit opening, the printing on the record medium between the printing zone and said exit opening being readable through said enclosure window, a muffler formed in part by a portion of the outer surface of said enclosure and in part by a plate, said muffler plate being spaced from said enclosure portion to provide a gap between which the record medium can continue to move after it passes through said exit opening, seal means spanning the gap between said enclosure portion and said muffler plate at each side of the path of record medium movement and at said exit opening, a hinge disposed to one side of the path of record medium movement for pivotally mounting said muffler plate and providing movement of said muffler plate between an operative position in which it serves as a muffler and an inoperative position in which the end portion of record medium can be readily severed and removed, and severing means at said exit opening for severing the end portion of the record medium, a sufficient portion of said muffler plate being transparent to provide readability of the printing on the record medium in said muffler.

8. The invention as defined in claim 7, wherein said severing means is provided by a tear edge at an end portion of said window, said seal means being in abutment with said end portion of said enclosure window when said muffler plate is in its operative position.

9. The invention as defined in claim 7, wherein said seal means has three seal portions disposed in a generally U-shaped arrangement, one seal portion being disposed at said exit opening, another seal portion being disposed at one side of the path of record medium movement, and the remaining seal portion being disposed at the other side of the path of record medium movement.

10. For a printer capable of impact printing on a continuous record medium: an enclosure for a printer, said enclosure having a window and a record medium exit opening, muffler means communicating with said exit opening and providing a passageway for the record medium which extends away from said exit opening, said muffler means including a window which serves as an extension of said enclosure window, said enclosure window and said muffler window enabling the printing on the record medium in the enclosure and in said muffler means to be read, and means mounting said muffler window for movement relative to said enclosure between an operative position and an inoperative position, the record medium can be readily severed without interference from either said muffler window or its mounting means when said muffler window is in its inoperative position because the path of movement of the record medium is not between said mounting means and said enclosure.

11. The invention as defined in claim 10, including severing means at said exit opening.

12. The invention as defined in claim 10, wherein said muffler window mounting means includes a hinge mounted beyond one side edge of the path of record medium movement so that the record medium can be severed at said exit opening.

13. The invention as defined in claim 10, wherein said muffler window mounting means slidably mounts said muffler window.

14. The invention as defined in claim 10, wherein said muffler window mounting means includes a guide disposed beyond each side edge of the path of record medium movement, said guides being in guiding engagement with said muffler window.

15. For a printer capable of impact printing on a continuous record medium: an enclosure for housing a printer, said enclosure having a record medium exit opening, a muffler communicating with said exit opening, said muffler having a pair of closely spaced muffler members providing a narrow gap through which the record medium can pass, and means for guiding the record medium through said exit opening and across the entire narrow gap into contact with one of said members, said enclosure including a window, and said guiding means also guiding the record medium into contact with said enclosure window.

16. For a printer capable of impact printing on a continuous record medium: an enclosure for housing the printer, an exit opening in the enclosure for the record medium, and a muffler communicating with said exit opening providing a passage for the record medium, said muffler having a movably mounted plate, said muffler plate having means for severing the record medium.

17. The invention as defined in claim 16, wherein said muffler plate includes a transparent portion to enable the printing on the record medium in said muffler to be read.

18. For a printer capable of impact printing on a continuous record medium: an enclosure for housing the printer, air ingress and egress openings in said enclosure, means providing forced passage of ventilating air into contact with the printer, said enclosure having an exit opening for the record medium, a muffler communicating with said exit opening, said muffler having closely spaced opposite surfaces providing a gap through which the record medium can move, and guide means for causing the record medium to span the gap between said opposite surfaces to minimize the flow of ventilating air through said muffler.

19. For a printer capable of impact printing on a record medium: an enclosure having wall structure and a shelf providing a first chamber and a second chamber, an opening in said shelf enabling the flow of air between said first and second chambers, air ingress means in one chamber and air egress means in the other chamber, air passageway means in said shelf interconnecting said first and second chambers, means providing the forced circulation of air through said chambers via said ingress and egress means and said air passageway means, said first chamber being adapted to receive a printer, record medium mounting means disposed below said first and second chambers, and a record medium passageway extending through and being isolated from said second chamber and opening into said first chamber, by which the continuous record medium can be supplied to said printer.

20. The invention as defined in claim 1, said enclosure having a passageway separate and distinct from said muffler passageway for the passage of ventilation air into contact with said printer, and means for forcing ventilation air through said enclosure passageway.

21. The invention as defined in claim 3, said enclosure having a passageway separate and distinct from said muffler passageway for the passage of ventilation air into contact with said printer, and means for forcing ventilation air through said enclosure passageway.

References Cited

UNITED STATES PATENTS

| | | | |
|---|---|---|---|
| 1,300,780 | 4/1919 | Rowan | 181—33.4 |
| 1,749,177 | 3/1930 | Baxter et al. | 181—33.4 |
| 2,517,147 | 8/1950 | Vee | 181—33.4 |
| 2,553,876 | 5/1951 | Smessaert et al. | 178—42 XR |
| 2,701,618 | 2/1955 | Montgomery | 181—33.4 |
| 3,087,578 | 4/1963 | Reed et al. | 181—33.4 |

FOREIGN PATENTS

| | | |
|---|---|---|
| 159,079 | 7/1940 | Austria. |
| 818,514 | 10/1951 | Germany. |
| 492,502 | 9/1938 | Great Britain. |

ROBERT S. WARD, Jr., Primary Examiner

U.S. Cl. X.R.

178—42

PO-1050
(5/69)

UNITED STATES PATENT OFFICE
CERTIFICATE OF CORRECTION

Patent No. 3,476,210 Dated November 4, 1969

Inventor(s) Robert O. Carlson

It is certified that error appears in the above-identified patent and that said Letters Patent are hereby corrected as shown below:

Column 1, line 32, "ventiltaed" should be --ventilated--.
Column 2, line 2, insert --in-- before "its".
Column 3, line 16, "pasageway" should be --passageway--.
line 24, "siutable" should be --suitable--.
line 73, "several lines have been printed, the part of the record" should be --severing edge 63 enabling the end portion of the record--

SIGNED AND
SEALED
MAY 12 1970

(SEAL)
Attest:

Edward M. Fletcher, Jr.
Attesting Officer

WILLIAM E. SCHUYLER, JR.
Commissioner of Patents